Nov. 18, 1958      W. C. WEHNER      2,860,473
VARIABLE SPEED ROTARY MOWER
Filed April 4, 1955      6 Sheets-Sheet 1
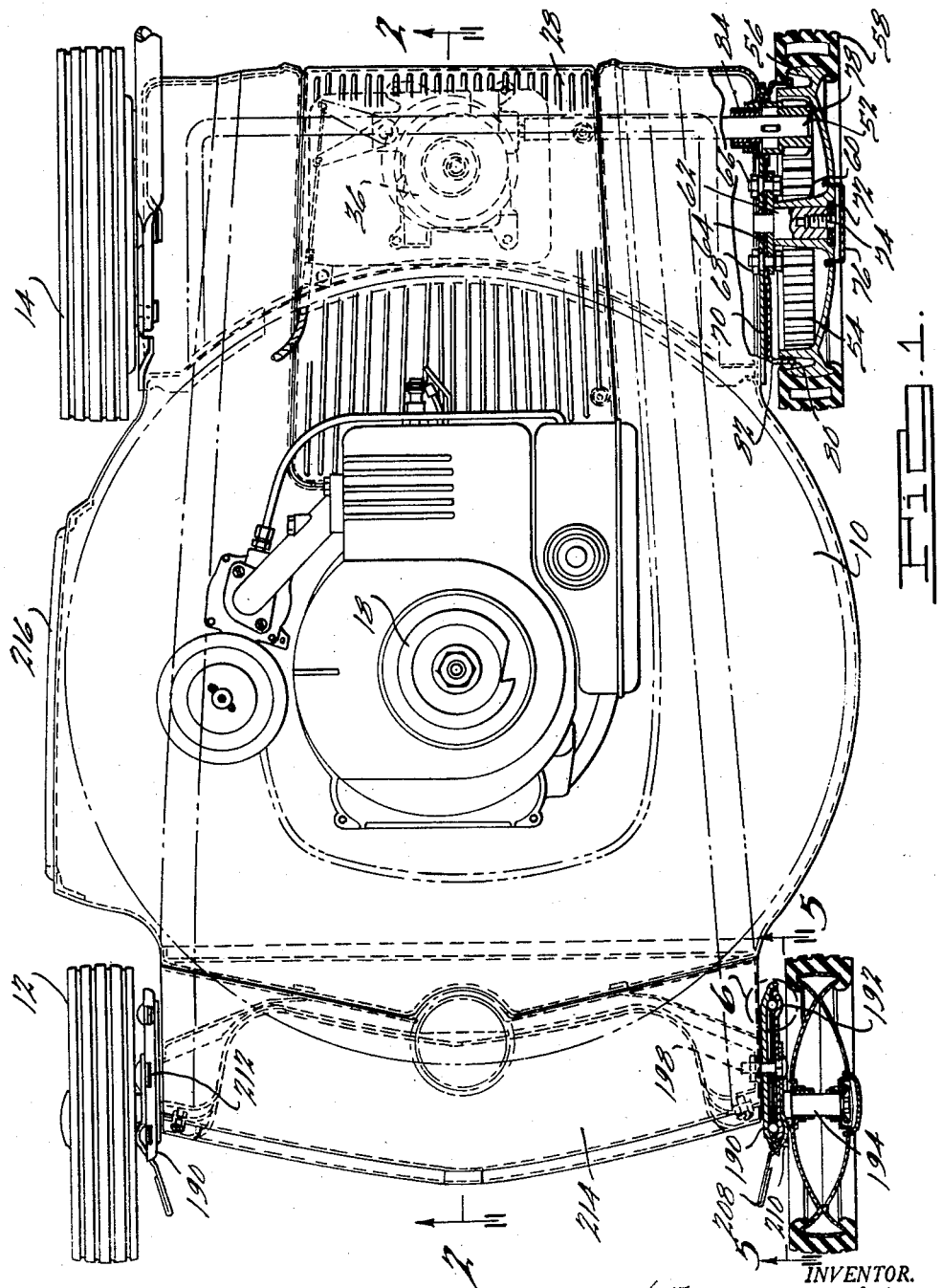
INVENTOR.
William C. Wehner
BY
Maxwell K. Murphy
ATTORNEY

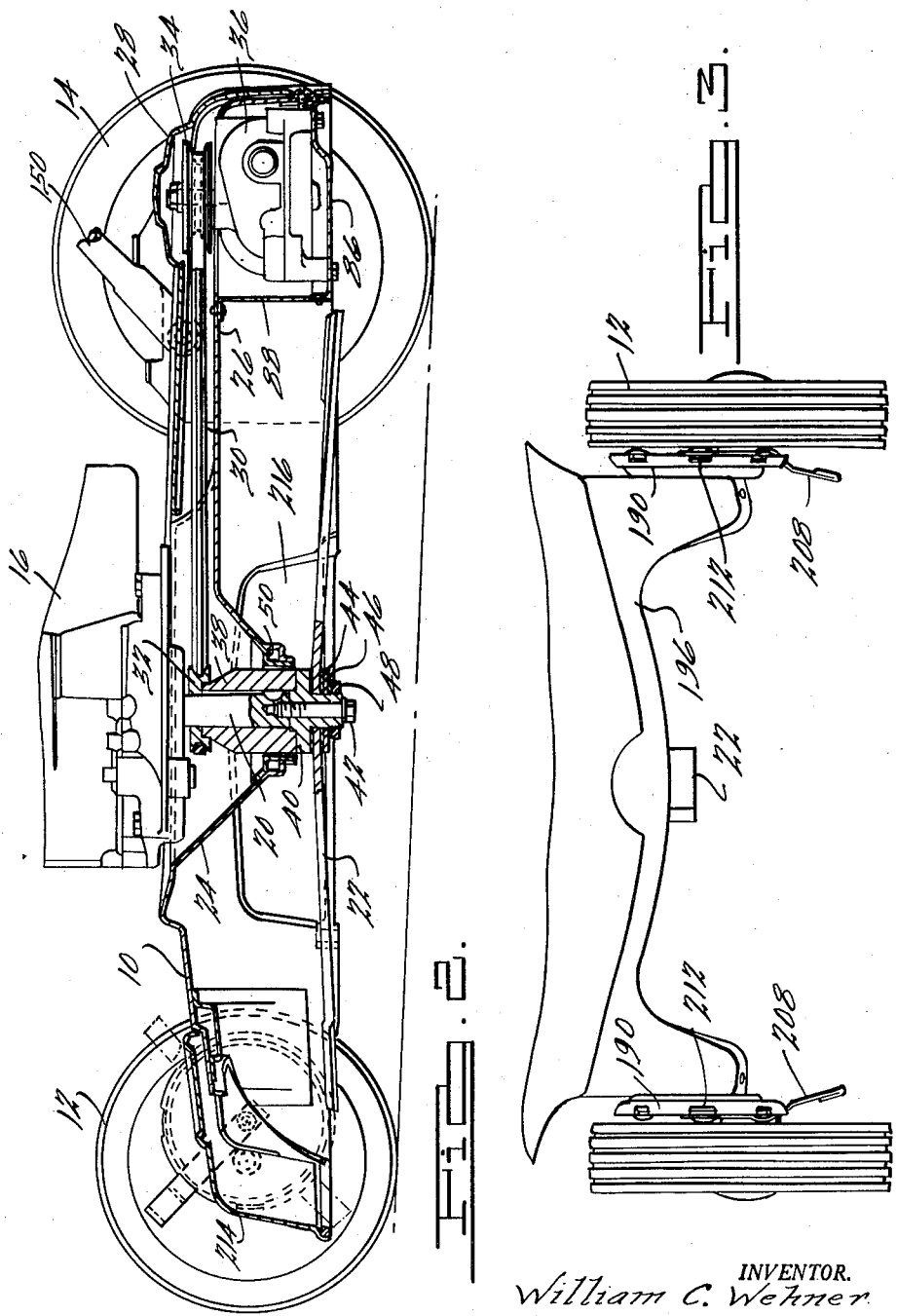

Nov. 18, 1958  W. C. WEHNER  2,860,473
VARIABLE SPEED ROTARY MOWER
Filed April 4, 1955  6 Sheets-Sheet 3

INVENTOR.
William C. Wehner.
BY
Maxwell K. Murphy
ATTORNEY.

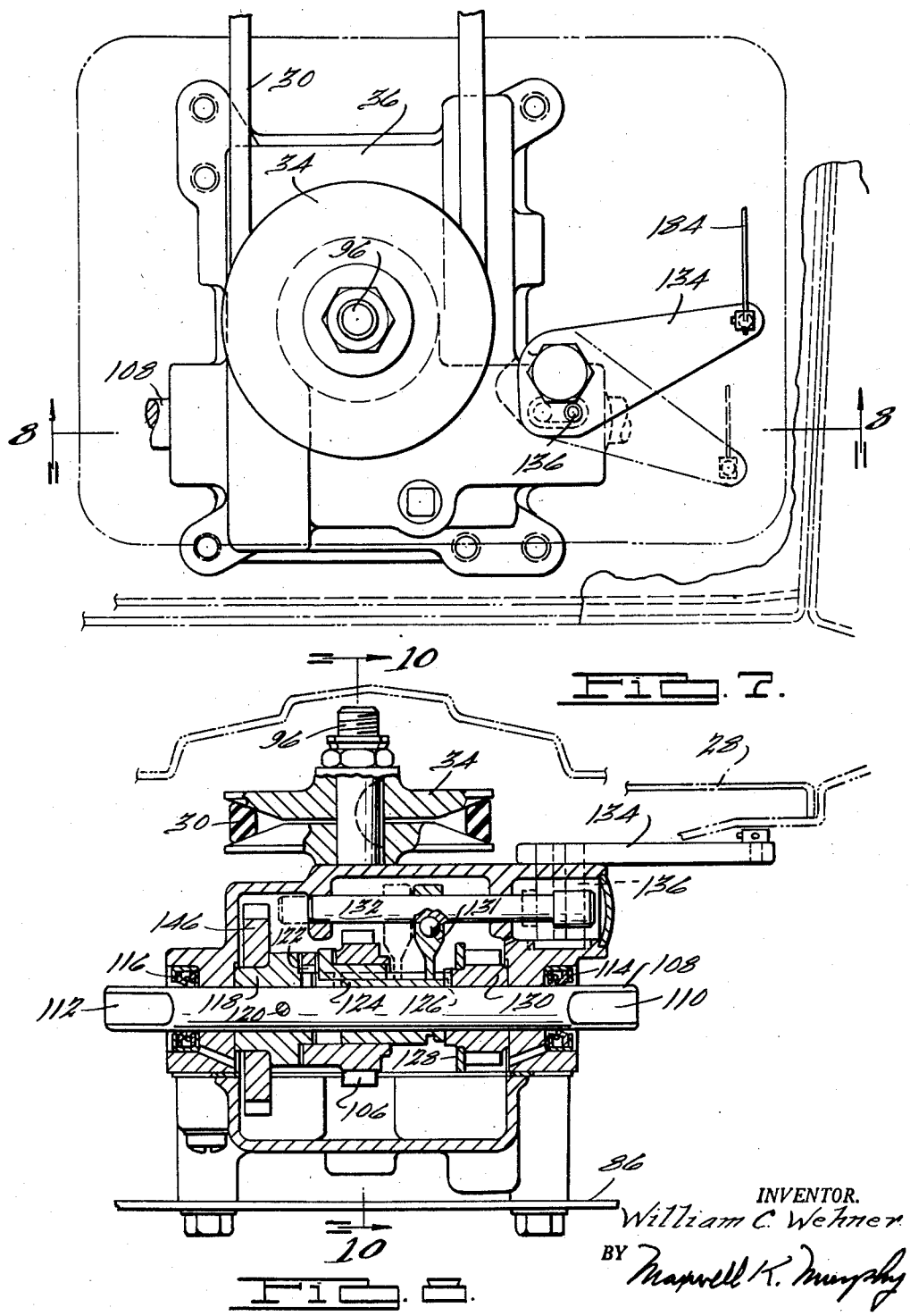

INVENTOR.
William C. Wehner
BY
Maxwell K. Murphy
ATTORNEY

Nov. 18, 1958 — W. C. WEHNER — 2,860,473
VARIABLE SPEED ROTARY MOWER
Filed April 4, 1955 — 6 Sheets-Sheet 6
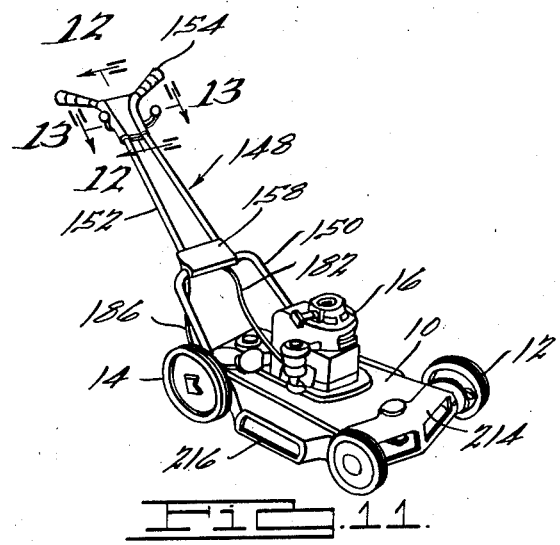
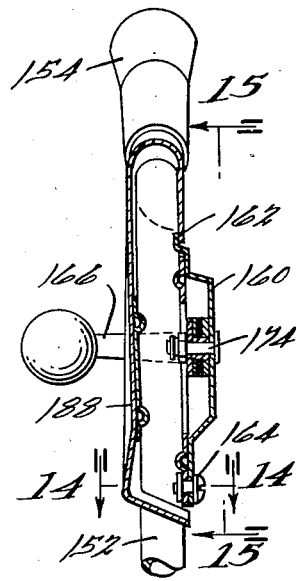
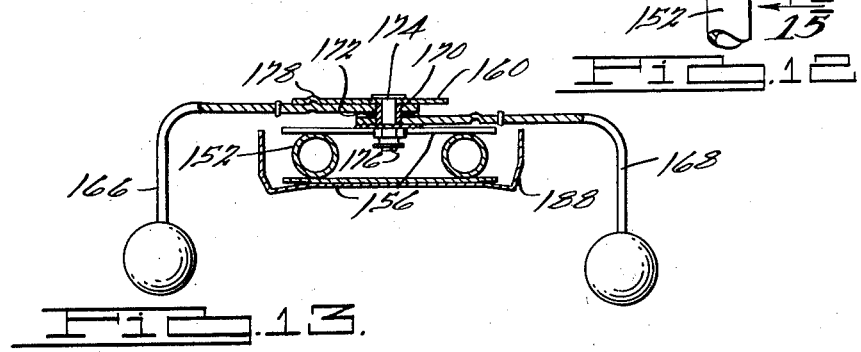
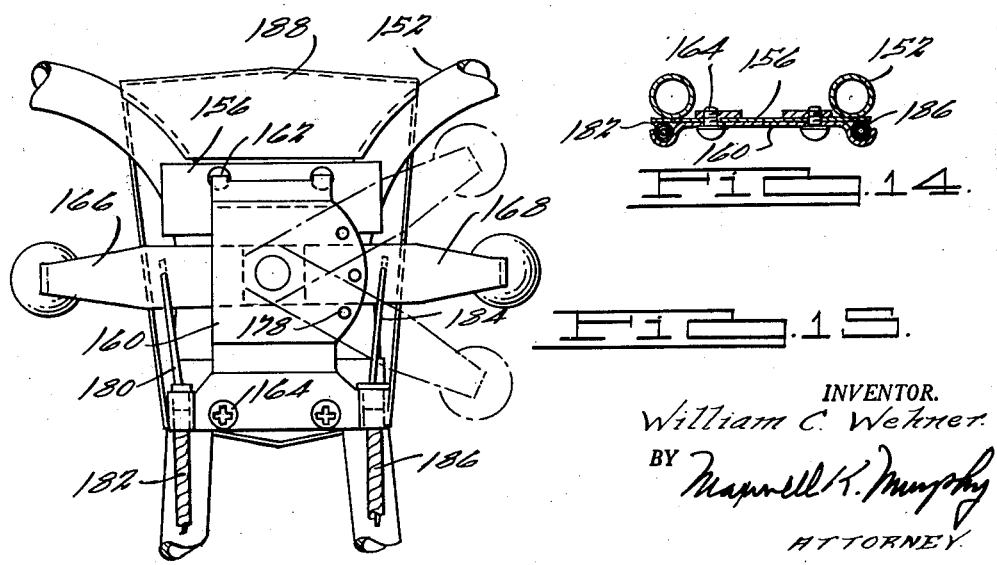
INVENTOR.
William C. Wehner
BY Maxwell K. Murphy
ATTORNEY

United States Patent Office 2,860,473
Patented Nov. 18, 1958

2,860,473

VARIABLE SPEED ROTARY MOWER

William C. Wehner, Grosse Pointe, Mich., assignor, by mesne assignments, to Moto-Mower, Inc., a corporation of Delaware Application April 4, 1955, Serial No. 498,997

3 Claims. (Cl. 56—25.4)

This invention relates to lawn mowers of the rotary blade type and particularly to self-propelled mowers of this type.

Lawn mowers having a motor-driven, horizontally disposed blade have become increasingly popular in recent years because of their versatility. In the majority of rotary mowers now on the market, the engine is mounted such that the crankshaft thereof is vertically disposed and the cutter blade is mounted directly on the lower end of the crankshaft and rotates at engine speed. Because of this mounting of the engine, difficulty and expense have been encountered in providing a suitable power connection from the engine crankshaft to the wheels of the mower, and for this reason, the wheels of the machine are not driven in most instances.

In instances where a power connection to the wheels has been provided in order to make the machine a true power lawn mower, complaints have arisen because of the absence of provision for varying the speed of traverse independently of the blade speed. Rotary mowers are usually purchased by people whose lawns or grounds vary in type of grass or stubble, roughness, grade, etc. In cases where grass of fairly uniform texture is being cut, the mower engine throttle can be adjusted to provide a comfortable walking speed of traverse and the rotational speed of the blade is not too important. However, when cutting relatively heavy undergrowth, weeds, tall grass, etc., it is desirable that the blade be rotated at maximum speed and the traversing speed be reduced. Sometimes when mowing in restricted space, it is advantageous to be able to release the drive to the mower wheels and traverse the mower entirely by pushing and pulling.

Accordingly, it is the principal object of this invention to provide a mower of the rotary type wherein the blade and the traversing wheels are power-driven and wherein means is provided for selectively varying the speed of traversal of the mower independently of blade speed and for disconnecting the drive to the mower wheels without shutting off blade rotation.

Another object is to provide, in a rotary mower, an easily operated device for adjusting the cutting height of the blade without use of tools and which does not require loosening of bolts, operation of clamps, or the like.

A still further object is to provide in this type of mower, complete protection for the operator from the rotating blade during normal use with provision for removal of one of the blade guard members when cutting tall grass, weeds, and the like.

A still further object is to provide an improved mounting for the engine and crankshaft whereby the cutter blade is mounted between two brass friction washers on a reduced portion of the blade hub, the latter being mounted in radial proximity to a reinforced annular portion of the main frame of the machine such that bending of the crankshaft caused by contact of the blade with an obstruction is substantially prevented.

Other objects and advantages of the invention will be apparent from the following specification which, taken in conjunction with the accompanying drawings, describes a preferred embodiment thereof.

In the drawings,

Fig. 1 is a top plan view of the improved rotary mower with parts broken away to show sectional details;

Fig. 2 is a longitudinal sectional view taken along line 2—2 of Fig. 1;

Fig. 3 is a partial elevation of the mower from the front with the guard removed;

Fig. 7 is an enlarged partial section taken on the line 7—7 of Fig. 4 showing the change-speed transmission in plan;

Fig. 8 is a vertical section taken along the line 8—8 of Fig. 7;

Fig. 11 is a perspective view of the mowing machine;

Fig. 12 is an enlarged section taken along line 12—12 of Fig. 11;

Fig. 13 is an enlarged section taken along line 13—13 of Fig. 11;

Fig. 14 is an enlarged section taken along line 14—14 of Fig. 12; and

Fig. 15 is a section taken along line 15—15 of Fig. 12.

Figure 4:
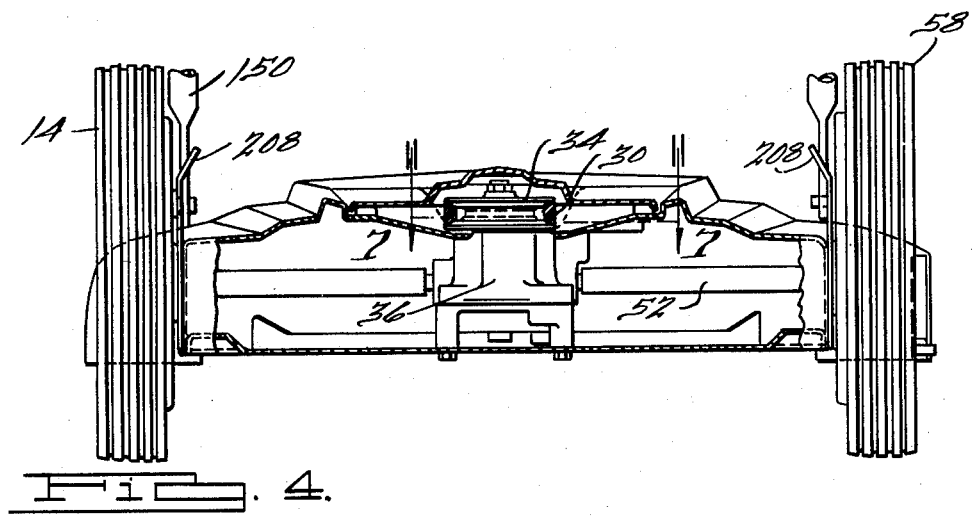
Fig. 4 is a partial transverse section taken just forward of the rear body frame member and showing the driving mechanism for the rear wheels.
Figure 5:
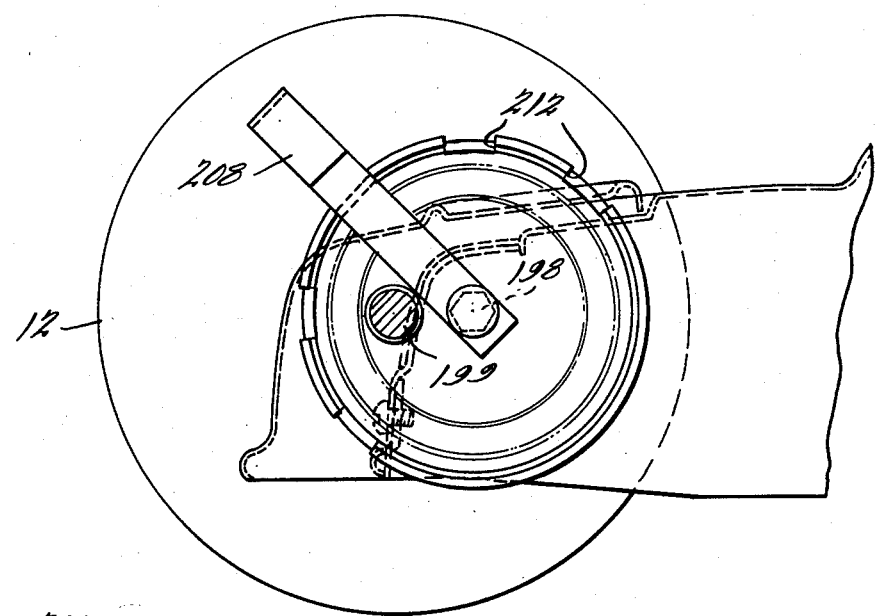
Fig. 5 is a detail showing of the front wheel adjustment means as seen when looking in the direction of the arrows 5—5 of Fig. 1.
Figure 6:
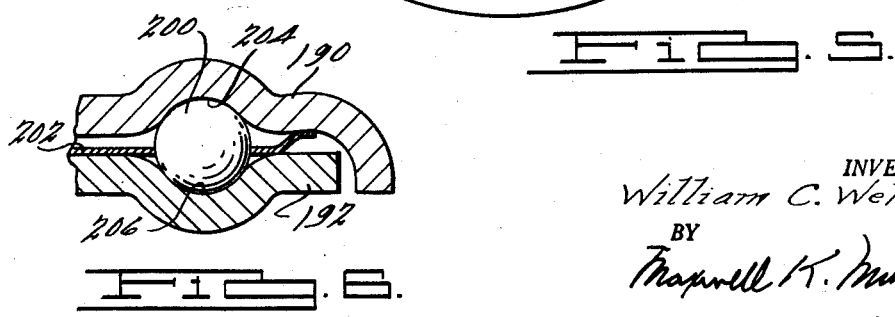
Fig. 6 is another detail of the wheel adjustment means shown in enlarged detail, the portion shown being indicated by the circle 6 in Fig. 1.
Figure 9:
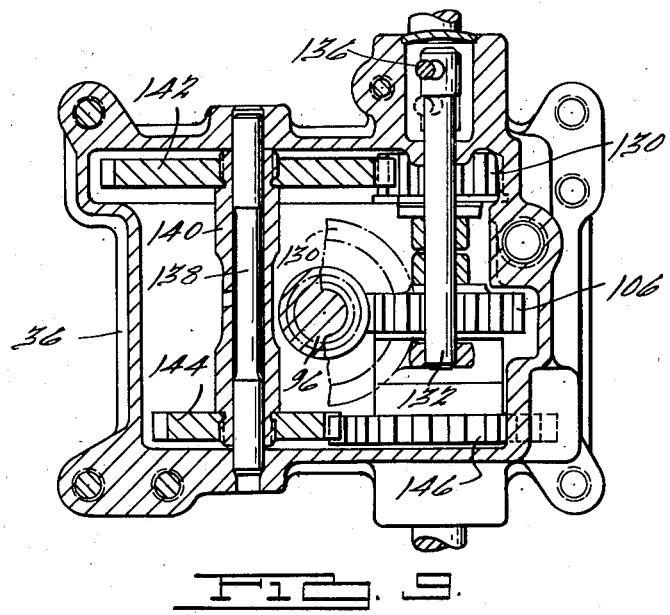
Fig. 9 is a horizontal section taken along line 9—9 of Fig. 10.

Referring now to the drawings, and to Fig. 11 in particular, it may be seen that the machine comprises a "deck" or chassis member 10' on which front wheels 12 and rear wheels 14 are mounted. The deck is of welded reinforced construction and carries the engine 16 on the top surface thereof. The engine is preferably of the 4-cycle, internal combustion type although any other suitable engine, electric motor, or the like may be used.

The engine 16 is mounted with its crankshaft vertically disposed. The crankshaft extends above the engine head (Fig. 1) and has a starting pulley 18 on the upper end. If desired, a recoil starter, electric starter, or similar device may be coupled to the shaft at this location. The shaft 16 extends below the bottom of the engine housing, the lower end 20 (Fig. 2) having the cutting blade 22 mounted directly thereon.

As will be seen in Fig. 2, the deck 10 is formed by stamping and has a conically dished portion 24 centrally thereof. Around the upper portion of the cone, a number of engine mounting bosses (not shown) are formed and the engine is rigidly mounted on these bosses. The rear portion of the cone has a depressed portion 26 which, together with a removable cover 28, form an enclosure for the driving belt 30. The belt 30 is trained around the pulleys 32 and 34. The pulley 34 is carried by the input shaft of the multi-speed transmission 36 which will be described later on.

The pulley 32 is mounted on a hub member 38 which is keyed to the shaft 20. A second hub member 40 carries the cutting blade assembly and has stepped surfaces which interfit with the member 38 and shaft 20 as shown, a cap screw 42 being provided for fastening the parts rigidly together.

The cutting blade 22 is sandwiched between two brass friction washers 44 over a round portion of the hub member 40 followed by a heavy steel D-hole washer 46 which fits over two milled flats. A hex nut 48 is threaded over the lower end of the member 40 and may be tightened to specific desired torque. This assembly of the cutting blade permits slippage of the blade on the hub in the event the blade hits an obstruction during use.

A reinforcing steel ring 50 is welded in the open lower end of the cone 24 and as will be seen from Fig. 2, the ring 50 surrounds a substantial portion of the hub member 38 with slight radial clearance. This construction is extremely effective in eliminating bending of the engine crankshaft since the shaft end portion 20 can deflect (when the blade 22 encounters an obstacle) only to the extent of the clearance between it and the inner surface of the hub member 38. Bending of the crankshaft sufficiently to impart a permanent "set" with subsequent failure thereof is thus entirely avoided.

Referring now particularly to Figs. 1 and 7–10 inclusive, it may be seen that the rear propelling wheels 14 are driven from the transmission gearbox 36 by means of axle shafts 52. Each of the driving wheels comprises a casting having an integrally formed internal gear 54 and an integrally formed rim 56 on which is mounted a rubber tire 58.

The hub 60 of each wheel is rotatably carried on a stub axle 62 which is, in turn, carried by a plate assembly 64. The latter is secured to the deck structure by the bolts 66 which threadedly engage the weld nuts 68 fixed to the mounting plates 70. The wheel hub 60 has a counterbore which holds a felt seal 72 that is slightly compressed when the wheel mounting screw 74 is tightened. A hub cap 76 snaps into place over the end of the screw 74 to protect the hub and present a neat appearance.

The internal gear 54 is engaged by a pinion 78 carried on the outer end of the axle shaft 52 and driven from the shaft through a conventional differential pawl which provides a one-way drive to the wheel. A felt seal 80 carried by a spider 82 secured to the plate 70 seals the assembly against entry of dirt or water which might adversely affect quiet operation of the gear and pinion drive. The shaft 52 is self-aligning and is supported near its outer end by a bushing 84 carried by the plate 70.

Figure 10:
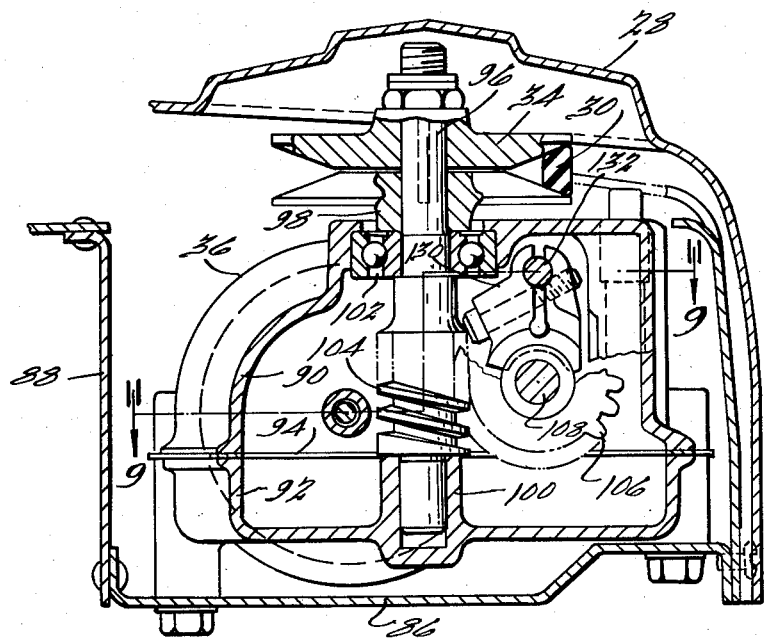
Fig. 10 is a vertical section taken along line 10—10 of Fig. 8.

The gearbox 36 is carried on a plate 86 which is suspended from the deck of the machine by a vertically disposed plate 88. The front deck cover extends downwardly as shown in Fig. 10 and the plate 86 is suitably fastened thereto, thereby providing a rigid support for the gearbox.

The gearbox 36 has a die cast top housing 90 and a similar lower housing 92 secured thereto by bolts with a gasket 94 between. The input shaft 96 extends upwardly through a boss 98 in the top housing, the lower end of the shaft being journaled in an internal boss 100 formed in the lower housing (see Fig. 10). A ball bearing 102 carried internally of the boss 98 provides antifriction support for the shaft adjacent the driven pulley 34.

Formed integrally on shaft 96 is a worm 104 disposed in meshing engagement with a driven gear 106 carried on the transmission output shaft 108. The latter is provided with milled flats 110, 112, on each of its ends for driving connection to the axle shafts 52. The output shaft is journaled in bored bearing openings in the opposite side walls of the upper gearbox housing, leather oil seals 114, 116, being provided as shown.

An output clutch member and gear hub 118 is keyed to shaft 108 by means of a hardened roll pin 120. The clutch member 118 has clutch teeth 122 engageable by corresponding teeth formed on a slidable clutch member 124. The latter is freely slidable and rotatable on the shaft 108 and has a splined driving connection with the driven gear 106. The opposite end of the clutch member 124 is formed with clutch teeth 126 which are engageable with similar teeth formed on a clutch member 128, the latter being secured to and carried by a gear 130 which is journaled on the shaft 108. The shiftable clutch member 124 is adapted to be shifted axially of the shaft 108 by a shifter fork 131 carried by slidable rod 132. The rod 132 is in turn moved to and fro by shift lever 134 through a pin connection 136.

Mounted in the upper gearbox housing on the opposite side of the input shaft 96 is a countershaft 138 (Fig. 9) on which is rotatably carried a cluster gear assembly 140 comprising a gear 142 disposed in constant mesh with the gear 130 and a gear 144 disposed in constant mesh with a gear 146 carried by the hub member 118.

Operation of the variable speed transmission will be understood from the foregoing. When the shifter lever 134 is in the full line position shown, clutch member 124 is engaged with the clutch teeth of low-speed gear 130 and drive from the engine 16 to the wheels 14 is through pulley 34, input shaft 96, worm 104, driven gear 106, clutch member 124, low-speed gear 130, cluster gear 142, cluster gear 144, high-speed gear 146, clutch member 118, shaft 108 and axles 52.

When the shifter lever 134 is in the broken line position, the clutch member 124 has been shifted toward the left of Fig. 8, thereby to disengage it from the gear 130 and engage it with the clutch teeth 122 on the hub 118. The drive is now direct from the gear 106 through clutch member 124, hub member 118 and shaft 108. Under direct drive conditions the cluster gears are rotated by high-speed gear 146, but because low-speed gear 130 free-wheels on shaft 108, the ratio-reduction gear train idles.

Shifter lever 134 may be moved to a position intermediate those illustrated, in which event the clutch member 124 does not engage either set of mating clutch teeth and neutral, non-driving condition results with the worm 104 and gear 106 only rotating.

The shifter lever 134 is movable from the handle of the machine as will be described later on herein. It will be appreciated that the shifter mechanism just described permits the mower engine to be started with the transmission in neutral position and the lever 134 may be left in neutral for cutting around flower beds, against fences, etc., where it is more convenient to maneuver by manual effort. The blade 22 is, of course, driven at all times that the engine is in operation.

Shift of the transmission into high-speed position will permit a driving speed of about 2½ M. P. H. or lower depending upon the engine throttle setting. With the transmission in low-speed position, a maximum speed of about ¾ M. P. H. is obtainable. Both of these driving speeds may be had with maximum revolution speed of the cutting blade thereby providing extreme flexibility with excellent cutting efficiency.

Reference is now made to Figs. 11–15 inclusive, for a description of the handle and control mechanism for the mover.

The mower is guided by a handle assembly 148 which is free-floating for eliminating shock transmission to the hands of the operator when mowing over rough terrain. The handle assembly is divided into the sub-assemblies for convenience in shipping. The lower sub-assembly 150 consists of a ¾ inch tube formed into an arch with each leg thereof pivotally attached to the rear portion of the deck 10 (see Fig. 2). The upper sub-assembly 152 comprises a pair of ¾ inch tubes bent outwardly at their upper ends on which handle grips 154 are placed.

Near their upper ends, the tubes are rigidly tied together by means of a plurality of tie straps 156 which are welded thereto. The lower handle assembly carries a support 158 in which the lower ends of the tubes 152 are detachably secured.

The throttle and change-speed controls for the mower are carried by the upper handle sub-assembly in a position convenient for manipulation by the operator. These controls are carried by a mounting plate 160 which is secured to spaced tie straps 156 by prongs 162 and screws 164. The throttle control lever 166 and clutch (or change-speed) control lever 168 are pivotally mounted on a spacer 170 and are separated by a spring washer 172 such that they are independently operable. The spacer is mounted on a headed bolt 174, and a locknut 176 is provided for fastening the entire assembly. The plate 160 is dished as shown in Fig. 12 and is provided with three holes or depressions 178 which serve as a detent for the clutch lever 168 for retaining the latter in low, high or neutral position. Suitable knobs are mounted on the respective ends of the control levers for hand engagement.

A Bowden wire 180 longitudinally slidable in a flexible sheath 182 connects the throttle lever 166 with the throttle of the engine 16 such that pushing of the lever forwardly increases engine speed and vice versa. The sheath 182 is retained against displacement in a semi-cylindrical portion formed integrally in the mounting plate 160 as shown in Fig. 14, and is fastened to the underside of the support 158 by a suitable bracket (not shown).

The clutch control lever 168 is connected to the transmission shifter lever 134 by a Bowden cable 184 contained in a sheath 186. This assembly is mounted on the handle assembly in a manner similar to the mounting of the throttle control as shown. A cover plate 188 secured to the tie strap 156 protects the lever mounting assembly and provides a neat appearance.

Attention is now directed to Figs. 1–6 inclusive, for a description of the means for adjusting the depth of cut of the mower.

The front wheel mounting comprises a pair of stamped ball races 190, 192, concentrically mounted. The outer race 192 has a stub axle 194 welded thereon one inch from the center of the race. The inner race 190 is welded to the vertical side portion of the front section 196 of the deck 10. The races are secured in assembled relation by a carriage bolt 198, a plurality of balls 200 being disposed between the races in grooves 204, 206, formed therein by stamping. A combined retainer and seal 202 of brass or similar material retains the balls in properly spaced relation and prevents entry of foreign matter.

A lever 208 of spring steel is mounted on the bolt 198, along with the outer race 192, and engages a slot 210 in the outer race 192. The inner race 190 is provided with a series of slots 212, preferably five or more, in one of which the lever 208 is engaged. It will now be clear that because of the eccentric mounting of the axle 194 on the outer race 192, rotation of that race around the axis of the bolt 198 will effect an adjustment of the front wheel 12 with respect to the body of the mower. This adjustment is easily accomplished without use of tools by engaging the spring lever 208 with the finger and bending it outwardly until it is disengaged from the slot 212 whereupon the outer race assembly may be rotated with respect to the inner race on the balls 200. The lever 208 may be reengaged in any desired one of the slots 212 to provide the height adjustment required. Each of the front wheels is thus individually adjustable.

The front wheels 12 are constructed of two identical stampings, welded together along a circumferential line medially intermediate the hub and rim portions as illustrated in Fig. 1, the outer marginal portions being flared and bent over to form a rim adapted to mount a rubber tire.

As may be seen from Figs. 1, 2, 5 and 11, the deck stamping 10 has skirts at the sides thereof which extend below the plane of the cutting blade 22 for safety. The right hand skirt is provided with a discharge chute 216 which permits discharge of grass cuttings (and leaf mulch when a mulching attachment is used) to one side of the machine. The deck stamping is open at the front such that the blade 22 extends forwardly of the deck between the front wheels 12. This permits cutting of tall grass, weeds, etc., which could not be cut if the blade did not extend beyond the front end of the deck. A removable cover 214 is suitably fastened to the deck during all ordinary operation of the mower, the cover extending downwardly sufficiently to cover the blade and prevent accidents.

I claim:

1. In a power lawn mower, in combination, a deck member having a horizontal portion, a marginal skirt portion and a downwardly extending conical portion at the center thereof; drive wheels mounted on said skirt portion; an engine mounted on said deck over said conical portion and having a drive shaft extending downwardly through said conical portion; a cutting blade mounted on said drive shaft below said conical deck portion; a driving pulley mounted on said drive shaft within said conical deck portion; said deck having an elongated, longitudinally disposed, depressed portion extending rearwardly from said conical portion; a speed reduction gearbox mounted on the underside of said depressed deck portion; an output shaft extending from each side of said gearbox; means drivingly connecting said output shaft with said drive wheels; an input shaft extending upwardly from said gearbox and through said depressed deck portion; a driven pulley mounted on the upper end of said input shaft in substantial horizontal alignment with said driving pulley; a belt connecting said pulleys, said pulleys and belt being disposed within said depressed deck portions.

2. The combination set forth in claim 1 including a removable cover secured over said depressed deck portion thereby to enclose said belt and driven pulley.

3. A power lawn mower comprising a horizontally extending deck having a downwardly extending conically dished central portion, front and rear wheels mounted thereon, an engine mounted on said deck and having a drive shaft extending downwardly through said dished portion, a cutting blade assembly including a hub member mounted on said shaft below said dished portion, said hub member being disposed radially adjacent the apex of said conically dished portion but unsupported thereby, the rotational clearance between said hub and said dished portion permitting slight misalignment of said shaft and slight axial bending thereof but preventing axial bending of said shaft sufficient to cause deformation thereof.

References Cited in the file of this patent

UNITED STATES PATENTS

| 1,866,662 | Matthews | July 12, 1932 |
| 1,935,211 | Krohn | Nov. 14, 1933 |
| 2,154,564 | Eisenlohr | Apr. 18, 1939 |
| 2,228,732 | Rabe | Jan. 14, 1941 |
| 2,228,740 | Wagner et al. | Jan. 14, 1941 |
| 2,302,570 | Peterson | Nov. 17, 1942 |
| 2,410,133 | Spatta | Oct. 29, 1946 |
| 2,476,526 | Badlat | July 19, 1949 |
| 2,564,201 | Hainke | Aug. 14, 1951 |
| 2,564,586 | Smith et al. | Aug. 14, 1951 |
| 2,566,164 | Callison | Aug. 28, 1951 |
| 2,589,845 | Mott | Mar. 18, 1952 |
| 2,697,904 | Goudie | Dec. 28, 1954 |
| 2,701,436 | De V. Harnett | Feb. 8, 1955 |
| 2,707,858 | Norton et al. | May 10, 1955 |
| 2,719,396 | Morris et al. | Oct. 4, 1955 |
| 2,722,432 | Roberton et al. | Nov. 1, 1955 |